Oct. 22, 1957
C. R. PETOSKEY
2,810,593
FLEXIBLE CONNECTING SLEEVE WITH RELEASABLE
SPRING CLAMPING MEANS
Filed Aug. 3, 1953
2 Sheets-Sheet 1
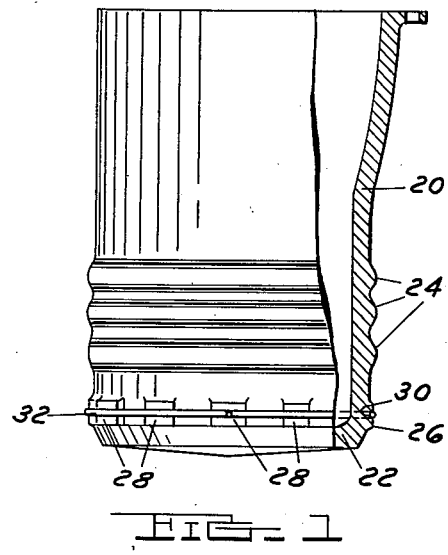
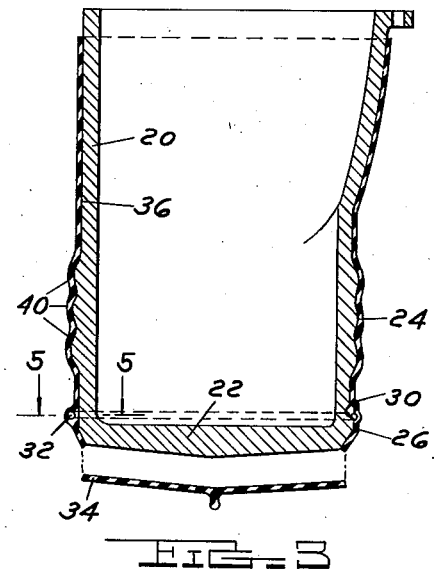
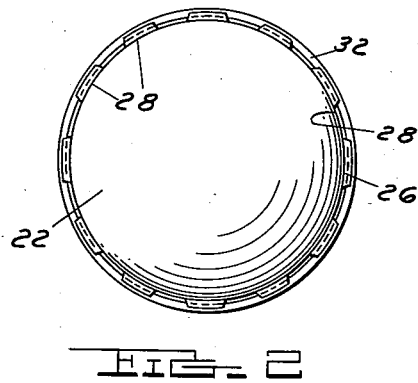
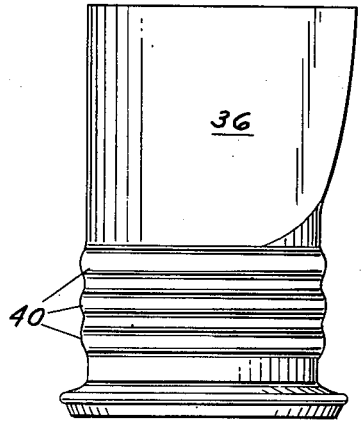
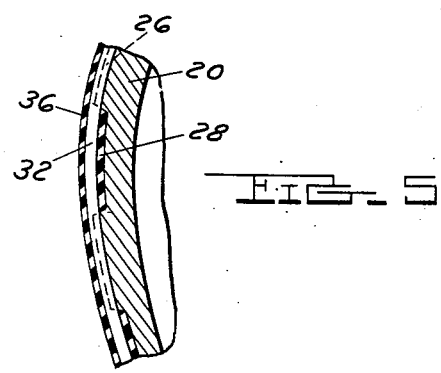
INVENTOR.
CHARLES R. PETOSKEY
BY
Barnes, Kisselle, Laughlin & Raisch
ATTORNEYS

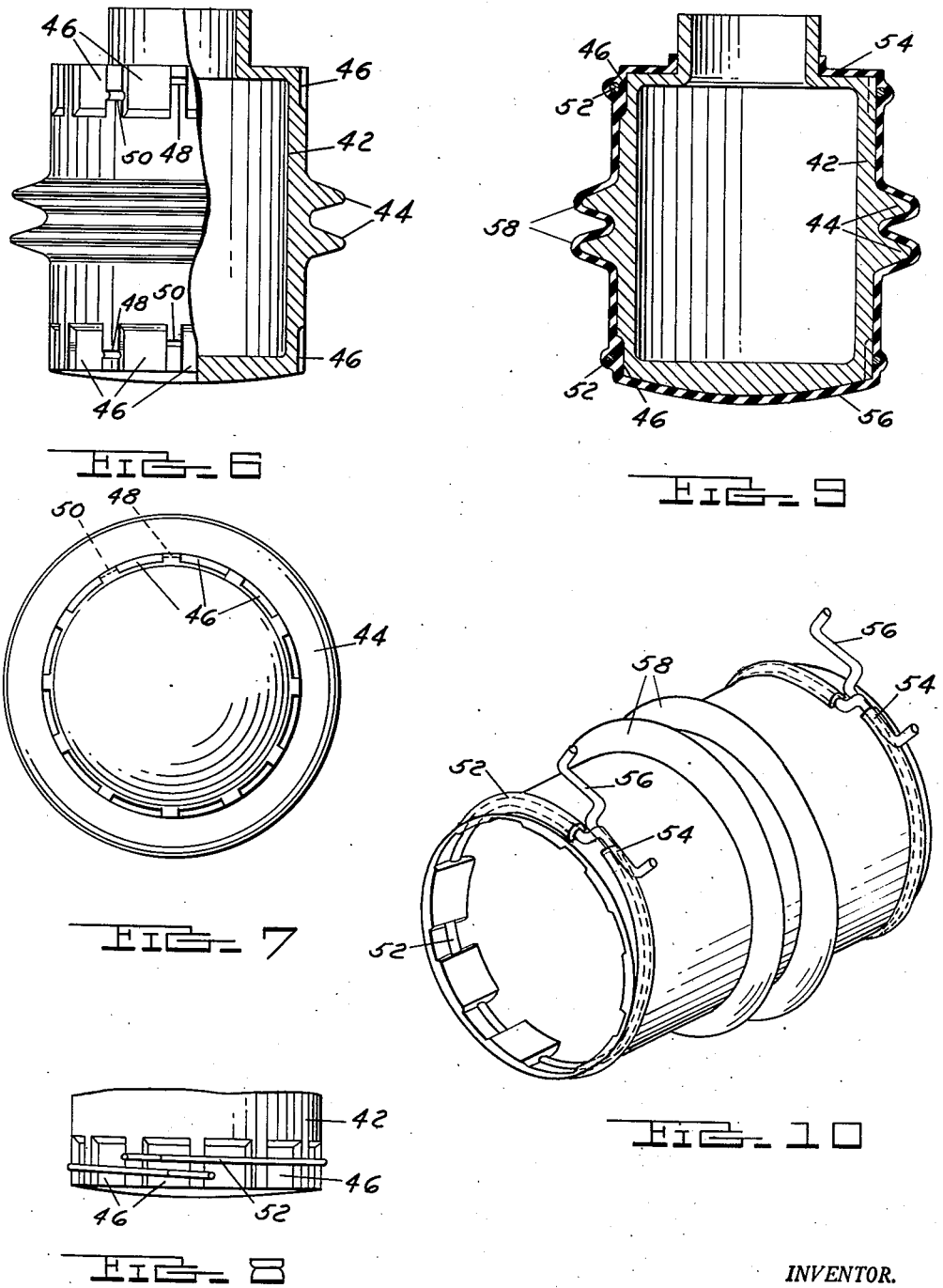

United States Patent Office 2,810,593
Patented Oct. 22, 1957

2,810,593

FLEXIBLE CONNECTING SLEEVE WITH RELEASABLE SPRING CLAMPING MEANS

Charles R. Petoskey, Detroit, Mich., assignor to Automotive Rubber Company, Incorporated, Detroit, Mich., a corporation of Michigan Application August 3, 1953, Serial No. 372,027

2 Claims. (Cl. 285—236)

This invention relates to a flexible sleeve and the method and apparatus for making the same.

It is an object of the present invention to provide a flexible sleeve formed of rubber or a similar product by a dipping operation and in combination therewith an embedded clamping means which allows the device to be readily applied to its particular installation. Devices of this type are used for closing a space between metal air passages and also for protecting joints around movable members and for numerous other purposes.

Briefly, the invention consists of a rubber sleeve formed with suitable flexing configurations around a mold and in combination with an expansible ring which can be temporarily mounted on the mold and permanently embedded in the sleeve which is formed on the mold.

Drawings accompany the specification, and the various views thereof may be briefly described as:

Figure 1, a view of a molding unit with an expansible ring applied.

Figure 2, an end view of the molding unit showing the position of the ring.

Figure 3, a view of the unit after being dipped and trimmed.

Figure 4, the finished sleeve product.

Figure 5, a sectional view on line 5—5 of Figure 3.

Figure 6, a modified type of mold.

Figure 7, an end view of the modified mold.

Figure 8, a view of the modified mold showing a split ring applied thereto at one end.

Figure 9, a view of the combination after dipping.

Figure 10, a perspective view of the completed sleeve after trimming.

Referring to the drawings, the hollow mold 20 is shown in Figure 1 with a closed end 22 and a plurality of ribs 24. Adjacent the closed end 22 is an annular boss 26 provided with circumferentially spaced indentations 28, each provided with circumferential grooves 30 to receive and locate a split ring 32 which forms a part of the finished sleeve.

An end view of the device in Figure 2 shows the relationship of the ring to the mold prior to dipping, there being a space between the ring and the mold at the indentations 28. In Figure 3 the mold is shown after being dipped in a rubber solution to form a relatively thick coating around the mold, including the closed end. The rubber fills the spaces 28 between the ring and the mold to embed the ring securely within the sheath formed on the mold. To form an open sleeve, an end 34 is put off the finished sleeve 36, the finished stripped sleeve being shown in Figure 4.

There is a certain shrinkage of the rubber after it is stripped from the sleeve, and this accounts for the reduced diameter of the sleeve except at the point where the ring 32 is embedded. The annular ribs 24 on the mold form annular ribs 40 on the finished sleeve to give it certain crease folds to increase flexibility.

It will be seen that it will be an easy matter to expand the metal length 32 over a round pipe or projection of any kind to clamp the sleeve in place on said pipe or projection.

In Figures 6 to 10 a modified construction is shown. A closed end mold 42 has annular bosses 44 formed thereon, and each end of the mold is formed with circumferentially spaced indentations 46. Between adjacent indentations as shown in Figure 6 axially spaced, circumferentially extending grooves 48 and 50 are provided for the purpose of locating the ends of a split, overlapping ring 52 on the end of the mold.

In Figure 9 a completely dipped mold with the two overlapping clamp rings 52 is shown prior to the stripping operation. The ends 54 and 56 of the mold can be severed from the sleeve either before or after stripping, and the completed sleeve is shown in Figure 10 complete with annular bosses 58 and with the embedded rings 52 which have radially offset end portions 54 and 56 to provide handles enabling ready expansion of the ring prior to its application as a closing conduit between two pipes or for any other suitable use.

The device is particularly adapted for use in automotive vehicles wherein heater passages and ventilation passages can be connected by a flexible sleeve, allowing for variations in manufacture and allowing for movement between the connected parts as the device is used.

I claim:

1. A combination sleeve and expansible grommet comprising, an expansible ring of spring material having ends approaching each other at a common point to permit expansion of the ring, a body of rubber embedding said rings throughout substantially 360°, said body of rubber completely covering the ring on the outer surface thereof and completely covering the inner surface of the ring in spaced axial portions integral with the main body of the covering rubber, leaving short, axial exposed portions of the ring circumferentially spaced around the inside thereof, and a skirt formed on said ring on one side thereof joined integrally with the covering body of rubber and extending in an axial direction from said ring, said ring being circumferentially expansible with the covering body of rubber to expand over a circular projection having a larger outer diameter than the inner diameter of the sleeve and ring.

2. A device as defined in claim 1 in which the ends of the expansible ring overlap on one side thereof and project radially outwardly to permit manipulating of the ring in an expanding and contracting motion.

References Cited in the file of this patent

UNITED STATES PATENTS

| 1,067,202 | Stacey | July 8, 1913 |
| 1,073,850 | Green | Sept. 23, 1913 |
| 1,219,756 | Meredith-Jones | Mar. 20, 1917 |
| 1,636,107 | Namiot | July 19, 1927 |
| 2,230,879 | Bronson | Feb. 4, 1941 |
| 2,308,310 | Ruemelin | Jan. 12, 1943 |
| 2,440,960 | Kuzmick | May 4, 1948 |
| 2,634,452 | Ripley | Apr. 14, 1953 |
| 2,642,911 | De Shazor | June 23, 1953 |
| 2,661,498 | Blaurock | Dec. 8, 1953 |
| 2,668,316 | Sturtevant | Feb. 9, 1954 |
| 2,669,753 | Hormann | Feb. 23, 1954 |
| 2,670,502 | Cox | Mar. 2, 1954 |